United States Patent
Ha

(10) Patent No.: US 10,969,751 B2
(45) Date of Patent: Apr. 6, 2021

(54) METHODS FOR DETERMINING PARAMETERS FOR CONTROLLING N ELECTRIC GENERATORS, METHOD FOR CONTROLLING N GENERATORS AND SYSTEM IMPLEMENTING SAID METHODS

(71) Applicant: COMMISSARIAT À L'ENERGIE ATOMIQUE ET AUX ENERGIES ALTERNATIVES, Paris (FR)

(72) Inventor: Duy Long Ha, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/682,740

(22) Filed: Nov. 13, 2019

(65) Prior Publication Data

US 2020/0150600 A1    May 14, 2020

(30) Foreign Application Priority Data

Nov. 13, 2018  (FR) ...................... 1860458

(51) Int. Cl.
  *H02J 4/00* (2006.01)
  *G05B 13/04* (2006.01)
  (Continued)

(52) U.S. Cl.
  CPC ........... *G05B 13/042* (2013.01); *G06Q 50/06* (2013.01); *H02J 3/381* (2013.01); *H02J 4/00* (2013.01)

(58) Field of Classification Search
  CPC .......... H02J 3/381; H02J 4/00; G05B 13/042; G06Q 50/06
  See application file for complete search history.

(56) References Cited

U.S. PATENT DOCUMENTS 6,681,155 B1   1/2004 Fujita et al.
9,722,443 B2 * 8/2017 Ishida ................. H01M 10/441
(Continued)

FOREIGN PATENT DOCUMENTS

EP        3 012 939 A1   4/2016
WO   WO 2011/128344 A2  10/2011

OTHER PUBLICATIONS

Search Report as issued in French Patent Application No. 1860458, dated Jun. 24, 2019.

*Primary Examiner* — Thai T Dinh
(74) *Attorney, Agent, or Firm* — Pillsbury Winthrop Shaw Pittman LLP

(57) ABSTRACT

A method for determining parameters for controlling N electric generators at an instant t, the method including, for a required power $P_{tot}(t)=\Sigma_{i=1}^{N}P_i(t)$ at an instant t with $P_i(t)$ the electric power supplied by the electric generator i at the instant t and a reserve power $P_{reserve}(t) \leq \Sigma_{i=1}^{N}(P_i^{max}-P_i(t)) \times \delta_i(t)$ at an instant t with $P_i^{max}$ the maximum power that the electric generator i can develop and $\delta_i(t)$ the coefficient of activation of the electric generator i which is equal to 1 when the electric generator is on and 0 when the electric generator is off, a step of determining the optimal power $P_i^{opt}(t)$ at the instant t associated with each electric generator i so as to minimise the fuel consumption per unit of electrical energy produced $$sfc(t) = \frac{1}{P_{tot}(t)} \sum_{i=1}^{N} f_i(P_i(t)) \times P_i(t)$$

with $f_i(x)$ the function giving the fuel consumption of the electric generator i for the electric power x.

10 Claims, 9 Drawing Sheets

(51) Int. Cl.
*G06Q 50/06* (2012.01)
*H02J 3/38* (2006.01)

(56) References Cited

U.S. PATENT DOCUMENTS

| | | | |
|---|---|---|---|
| 10,167,011 B2* | 1/2019 | Han | H02P 23/0004 |
| 2005/0286179 A1* | 12/2005 | Huff | H02J 3/50 |
| | | | 361/20 |
| 2012/0310608 A1* | 12/2012 | Nikovski | H02J 3/381 |
| | | | 703/2 |
| 2013/0342020 A1 | 12/2013 | Blevins et al. | |
| 2014/0152007 A1 | 6/2014 | Sterregaard et al. | |
| 2017/0324243 A1* | 11/2017 | Ghosh | H02J 3/005 |

* cited by examiner

METHODS FOR DETERMINING PARAMETERS FOR CONTROLLING N ELECTRIC GENERATORS, METHOD FOR CONTROLLING N GENERATORS AND SYSTEM IMPLEMENTING SAID METHODS

CROSS-REFERENCE TO RELATED APPLICATIONS

This application claims priority to French Patent Application No. 1860458, filed Nov. 13, 2018, the entire content of which is incorporated herein by reference in its entirety.

FIELD

The technical field of the invention is that of the control of a plurality of electric generators. The present invention relates to a method for determining parameters for controlling N electric generators, a method for controlling N generators and a system implementing said methods.

BACKGROUND

Generally speaking, when a micro network is supplied by a plurality of electric generators, it is known to control the activation and the deactivation of the electric generators manually as a function of the power required on the network. More specifically, as a function of this required power, an operator is going to decide the number of generators to turn on. In automated methods, the operator sets a threshold above which a given generator is going to be activated, which makes it possible to respond automatically to a modification of the required power. This strategy comprises however several drawbacks. Firstly, it does not take into account the output curve of the electric generator (in other words the fuel consumption per unit of electrical energy produced) which does not make it possible to optimise fuel consumption. In addition, it does not take into account the temperature of the generators, which can lead to heating of the generators that can lead to damage or even fire safety problems. Finally, it does not make it possible to take into account an easily mobilizable reserve power necessary in certain applications.

There thus exists a need for a control method making it possible to take account of the output of each generator and to take into account their temperature while ensuring that reserve power is available.

SUMMARY

An aspect of the invention offers a solution to the aforementioned problems, by making it possible to supply control set points that are a function of a required power and of a reserve power, and which take into account the output of the generators or even the temperature of the generators.

To do so, a first aspect of the invention relates to a method for determining parameters for controlling N electric generators at an instant t, the method including, for a required power $P_{tot}(t)=\Sigma_{i=1}^{N} P_i(t)$ at an instant t with $P_i(t)$ the electric power supplied by the electric generator i at the instant t and a given reserve power $P_{reserve}(t) \leq \Sigma_{i=1}^{N}(P_i^{max}-P_i(t)) \times \delta_i(t)$ at an instant t with $P_i^{max}$ the maximum power that the electric generator i can generate and $\delta_i(t)$ the coefficient of activation of the electric generator i which is equal to 1 when the electric generator is on and 0 when the electric generator is off, a step of determining the optimal power $P_i^{opt}(t)$ at the instant t associated with each electric generator i so as to minimise the fuel consumption per unit of electrical energy produced $$sfc(t) = \frac{1}{P_{tot}(t)}\sum_{i=1}^{N} f_i(P_i(t)) \times P_i(t)$$

with $f_i(x)$ the function giving the fuel consumption of the electric generator i for the electric power x.

Thanks to the invention, it is possible to obtain the distribution of the optimal power for a required power while ensuring a given reserve power and while optimising the fuel consumption of the electric generators. Electric generator is taken to mean a generator unit, a fuel cell or, more generally, any electricity source that consumes fuel in order to produce electrical energy.

Apart from the characteristics that have been mentioned in the preceding paragraph, the method according to a first aspect of the invention may have one or more complementary characteristics among the following, considered individually or according to all technically possible combinations thereof.

In an embodiment, the step of determining the optimal power $P_i^{opt}(t)$ at the instant t associated with each electric generator i includes:
- a sub-step of determining an activation profile $\delta(t)$ making it possible to respect the relationship $P_{reserve}(t) \leq \Sigma_{i=1}^{N}(P_{max}^i-P_i(t))\times\delta_i(t)$ and corresponding to the lowest number of activated electric generators, the determination being carried out while assuming an equitable distribution of the electric power produced $P_i^{eq}$ by each electric generator i;
- a sub-step of computing, for a plurality of distributions of the power supplied $P_i(t)$ by each electric generator i compatible with the determined activation profile $\delta(t)$ and respecting the equality $P_{tot}(t)=\Sigma_{i=1}^{N}P_i(t)$, the fuel consumption per unit of electrical energy produced $$sfc(t) = \frac{1}{P_{tot}(t)}\sum_{i=1}^{N} f_i(P_i(t)) \times P_i(t);$$

- a sub-step of determining the distribution of the electric power $P_i(t)$ supplied by each generator, designated optimal power $P_i^{opt}(t)$ such that min $$\left(\frac{1}{P_{Tot}(t)}\left[\sum_{i=1}^{N} f_i(P_i(t)) \times P_i(t)\right]\right) = \frac{1}{P_{Tot}(t)}\left[\sum_{i=1}^{N} f_i(P_i^{opt}(t)) \times P_i^{opt}(t)\right]$$

so as to obtain at least one optimal distribution of power.

Equitable distribution is taken to mean a distribution such that for any activated generator i, j the relationship $$\frac{P_i(t)}{P_i^{max}} = \frac{P_j(t)}{P_j^{max}}$$

is met while respecting $P_{Tot}(t)=\Sigma_{i=1}^{N}P_i(t)\delta_i(t)$.

In an embodiment, each generator i is associated with a minimum power $P_i^{min}$.

Thus, in addition to a maximum power, the method according to a first aspect of the invention may take into account a minimum power.

In an embodiment, each electric generator i is associated with a temperature $T_i(t)$, the variation in this temperature at the instant t being given by $$\frac{dT_i(t)}{dt} = g_i(P_i(t), T_i(t))$$

where $g_i(x, y)$ is a function that gives the variation in temperature of the generator i as a function of the power x supplied by the generator i and of the temperature y of the generator, the temperature being taken into account during the determination of the control parameters.

In an embodiment, during the sub-step of determining the distribution of the electric power $P_i(t)$ supplied by each generator, when several optimal distributions are determined, the distribution or the distributions retained are those that attribute to each electric generator i an electric power $P_i(t)$ inversely proportional to the temperature $T_i(t)$ of the electric generator i.

In an embodiment, during the sub-step of determining the distribution of the electric power $P_i(t)$ supplied by each generator, when several optimal distributions are determined, the distribution or the distributions retained are those that make it possible to minimise the maximum temperature reached by each electric generator i for a given horizon t+H where H is the duration separating the instant t of the considered horizon.

Thus, it is possible to take into account the temperature of each electric generator in the determination of the set points.

A second aspect of the invention relates to a method for determining parameters for controlling N electric generators at an instant t, the method including, for a required power $P_{tot}(t) = \Sigma_{i=1}^{N} P_i(t)$ at an instant t with $P_i(t)$ the electric power supplied by the electric generator i at the instant t and a reserve power $P_{reserve}(t) \leq \Sigma_{i=1}^{N}(P_i^{max} - P_i(t)) \times \delta_i(t)$ at an instant t with $P_i^{max}$ the maximum power that the electric generator i can develop and $\delta_i(t)$ the coefficient of activation of the electric generator i which is equal to 1 when the electric generator is on and 0 when the electric generator is off:

- a step of determining the optimal power $P_i^{opt}(t)$ at the instant t associated with each electric generator i so as to minimise the fuel consumption per unit of electrical energy produced $$sfc(t) = \frac{1}{P_{tot}(t)} \sum_{i=1}^{N} f_i(P_i(t)) \times P_i(t)$$

with $f_i(x)$ the function giving the fuel consumption of the electric generator i for the electric power x noted $sfc^{opt}$,

- a step of determining the fuel consumption per unit of electrical energy produced $$sfc(t) = \frac{1}{P_{tot}(t)} \sum_{i=1}^{N} f_i(P_i(t)) \times P_i(t)$$

noted $sfc^{eq}$ and associated with an equitable distribution of the electric power supplied by each generator, the distribution being such that $\forall i \in [1,N]$; $P_i(t) \leq r_i P_i^{max}$ with $r_i$ the fraction of the maximum power such that $\forall i$; $r_i \in ]0,1]$;

- a step of determining the power $P_i(t)$ associated with each generator as a function of the value of $sfc^{eq}$ and $sfc^{opt}$.

As a reminder, equitable distribution is taken to mean a distribution such that for any activated generator i,j the relationship $$\frac{P_i(t)}{P_i^{max}} = \frac{P_j(t)}{P_j^{max}}$$

is met while respecting $P_{Tot}(t) = \Sigma_{i=1}^{N} P_i(t) \delta_i(t)$.

Apart from the characteristics that have been mentioned in the preceding paragraph, the method according to a second aspect of the invention may have one or more complementary characteristics among the following, considered individually or according to all technically possible combinations thereof.

In an embodiment, the maximum power fraction of a generator is chosen such that $\min(f_i) = f_i(r_i P_i^{max})$ where $f_i(x)$ is the function giving the fuel consumption per unit of electrical energy produced by the electric generator i for the electric power x.

In an embodiment, each generator i is associated with a minimum power $P_i^{min}$.

In an embodiment, each electric generator i is associated with a temperature $T_i(t)$, the variation in this temperature at the instant t being given by $$\frac{dT_i(t)}{dt} = g_i(P_i(t), T_i(t))$$

where $g_i(x,y)$ is a function that gives the variation in temperature of the generator i as a function of the power x supplied by the generator i and of the temperature y of the generator, the temperature being taken into account during the step of determining the power $P_i(t)$ associated with each generator.

In an embodiment, the step of determining the power $P_i(t)$ associated with each generator includes:

a sub-step of determining the ratio $$\frac{sfc^{eq}}{sfc^{opt}};$$

and
when the ratio $$\frac{sfc^{eq}}{sfc^{opt}}$$

is greater than a predefined threshold, a sub-step of determining the power associated with each generator $P_i(t)$ conforming to the equitable distribution of supplied power, if not, a sub-step of determining the power associated with each generator $P_i(t)$ conforming to the optimal distribution of supplied power.

A third aspect of the invention relates to a method for controlling N electric generators including a first step of implementing a method for determining parameters for controlling N electric generators according to a first or a second aspect of the invention and a second step of sending the parameters thereby determined to the N electric generators.

Thus, it is possible to benefit from the advantages of the method according to a first or a second aspect of the invention in the control of N electric generators.

A fourth aspect of the invention relates to a method for controlling N electric generators including an initialisation phase during which the method according to a first aspect of the invention is implemented a plurality of times, each implementation being carried out with different values of required power $P_{tot}(t)$ and of reserve power $P_{reserve}(t)$ so as to obtain a look up table and a second control phase during which the control parameters are sent to the N electric generators, the control parameters being determined using the look up table.

Thus, it is possible to benefit from the advantages of the method according to a first aspect of the invention in the control of N electric generators. In addition, the use of a look up table makes it possible to have available rapidly suitable set points, the computations having been performed in advance and stored in the table.

A fifth aspect of the invention relates to a control system including one or more electronic circuits for implementing the steps of the method according to a first, second or third aspect of the invention.

A sixth aspect of the invention relates to a computer programme including machine executable instructions which, when the programme is run by a computer, lead it to implement the steps of the method according to a first, second, third or fourth aspect of the invention.

A seventh aspect of the invention relates to a non-transitory computer readable data support, on which is recorded the computer programme according to a sixth aspect of the invention.

The invention and its different applications will be better understood on reading the description that follows and by examining the figures that accompany it.

BRIEF DESCRIPTION OF THE FIGURES

The figures are presented for indicative purposes and in no way limit the invention.

DETAILED DESCRIPTION

Unless stated otherwise, a same element appearing in the different figures has a single reference.

Figure 1:
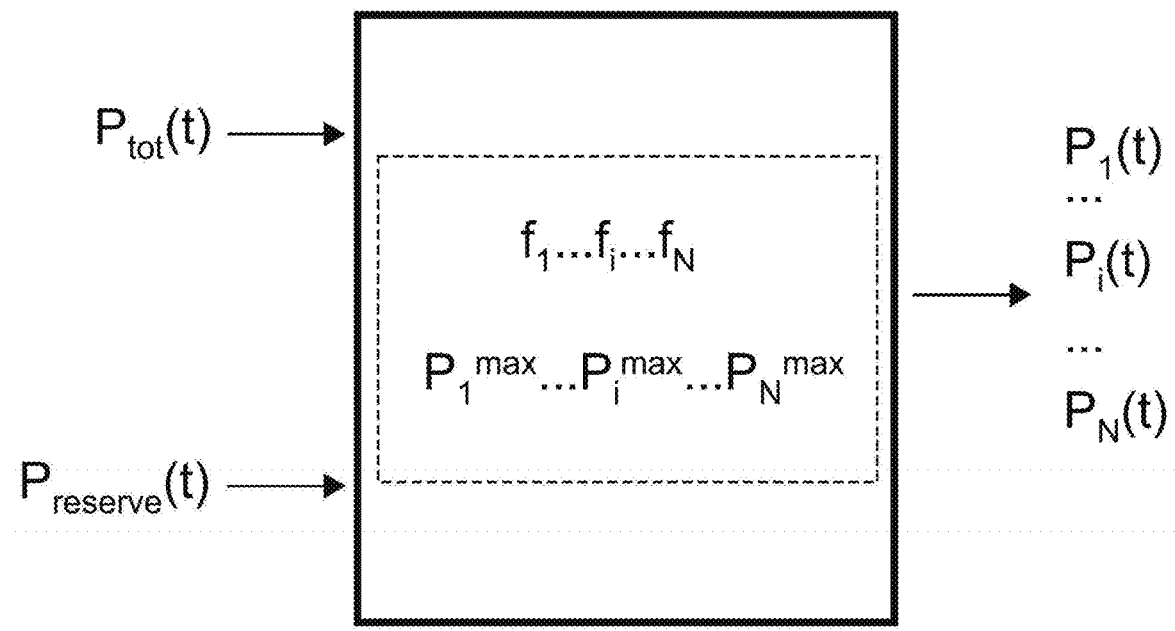
FIG. 1 shows a schematic representation of an embodiment of a method according to a first aspect of the invention.
Figure 2:
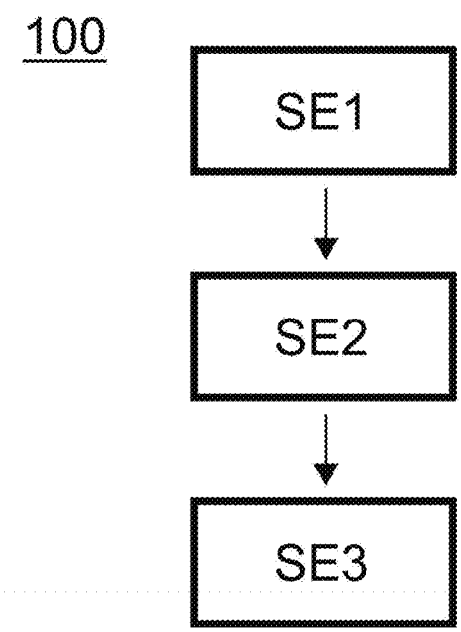
FIG. 2 shows a logic diagram of an embodiment of a method according to a first aspect of the invention.

A first embodiment illustrated in FIG. 1 and in FIG. 2 relates to a method 100 for determining parameters for controlling N electric generators at an instant t. An electric generator may be a generator unit, a fuel cell or, more generally, any electricity source that consumes fuel in order to produce electrical energy. The method 100 according to a first embodiment may be implemented by a computing system, for example a processor, an ASIC or FPGA card, associated with a memory. The memory may contain the instructions and variables necessary for the execution of the method by the computing system. The parameters necessary for the execution of the method may be input by an operator and/or obtained automatically (using sensors, etc.)

The method 100 is a function of several parameters. The first of these parameters is the power $P_{tot}(t)$ required at an instant t from the N electric generators. The latter is given by the formula $P_{tot}(t)=\Sigma_{i=1}^{N}P_i(t)$ with $P_i(t)$ the electric power supplied by the electric generator i at the instant t. In other words, the sum of the powers supplied by each electric generator i are equal to the required power. The second of these parameters is the reserve power $P_{reserve}(t) \leq \Sigma_{i=1}^{N}(P_i^{max}-P_i(t)) \times \delta_i(t)$ with $P_i^{max}$ the maximum power that the electric generator i can develop (which implies that $P_i(t) \leq P_i^{max}$) and $\delta_i$ the coefficient of activation of the electric generator i which is equal to 1 when the electric generator is on and 0 when the electric generator is off (and thus the number of active generators N'(t) may be obtained by the following formula $N'(t)=\Sigma_{i=1}^{N}\delta_i(t)$). This reserve power reflects the fact that it is easier to call upon the power of an active generator than to activate a new generator. It is thus desirable to have available at each instant t, from the active generators, a reserve power. This is for example the case of ships for which the role of electric generator is played by generator units of which the activation is not instantaneous and which must however have available a reserve electric power for reasons of safety.

Figure 3:
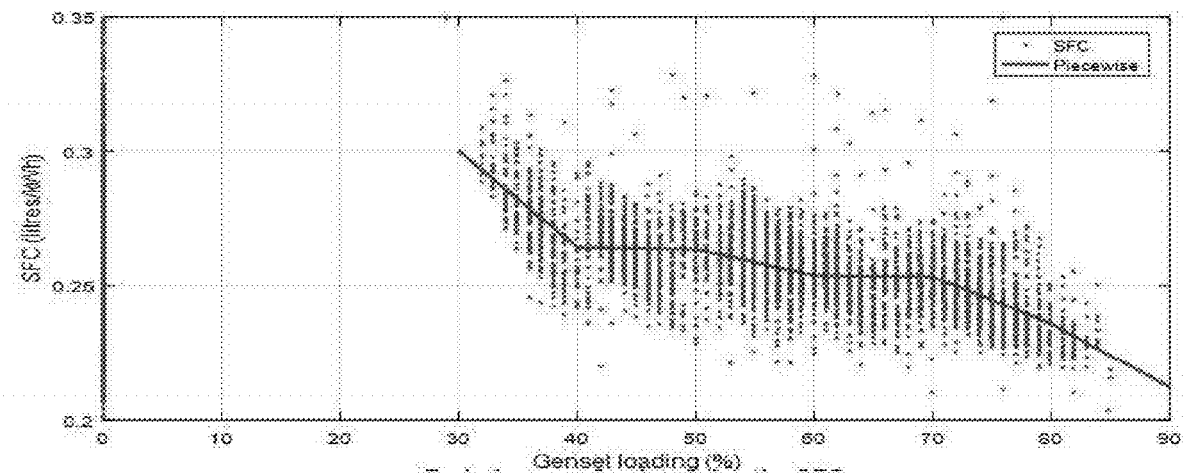
FIG. 3 shows a curve representing the fuel consumption per unit of electrical energy produced by an electric generator as a function of the power supplied by the generator.
Figure 4:
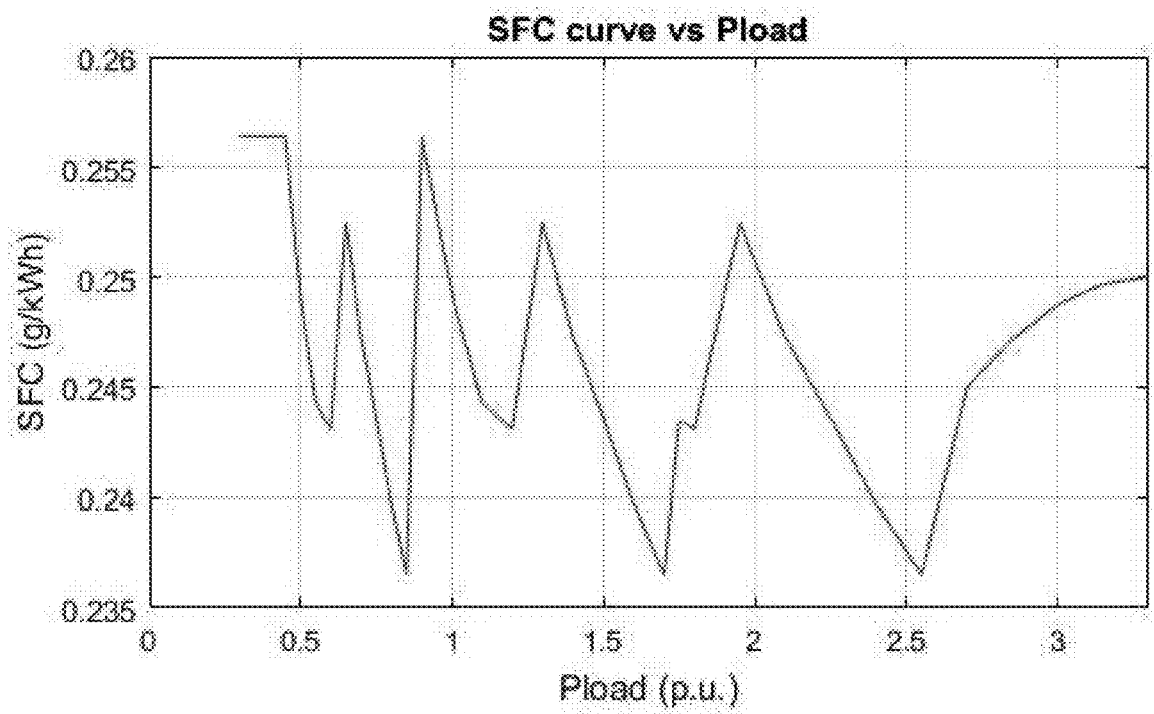
FIG. 4 shows a curve representing the fuel consumption per unit of electrical energy produced for N electric generators as a function of the power supplied by the N generators.

In addition to the aforementioned parameters, the method takes into account the fuel consumption per unit of electrical energy produced $$sfc(t) = \frac{1}{P_{tot}(t)} \sum_{i=1}^{N} f_i(P_i(t)) \times P_i(t)$$

with $f_i(x)$ the function giving the fuel consumption per unit of electrical energy produced by the electric generator i for the electric power x. An example of function $f_i(x)$ giving the fuel consumption per unit of electrical energy produced by the electric generator i is illustrated in FIG. 3 in the case of a generator unit. The points correspond to the experimental measurements and the curve corresponds to a curve determined from these measurements. An example of the value of sfc in the case of N electric generators as a function of the required power $P_{tot}(t)$ is illustrated in FIG. 4 in the case of generator units. In order to take account of this fuel consumption per unit of electrical energy produced sfc(t), the method according to a first aspect of the invention, from the required power $P_{tot}(t)$ and the reserve power $P_{reserve}(t)$, implements a step of determining the optimal power $P_u^{tot}(t)$ at the instant t associated with each electric generator i so as to minimise the fuel consumption per unit of electrical energy produced sfc(t).

Thus, at the end of the method according to the invention, each electric generator i may be associated with an optimal power $P_i^{opt}(t)$. The plurality of optimal powers $P_i^{opt}(t)$ thereby obtained complies with the following three conditions:

$$P_{tot}(t) = \sum_{i=1}^{N} P_i^{opt}(t);$$

$$P_{reserve}(t) \leq \sum_{i=1}^{N} (P_i^{max} - P_i^{opt}(t)) \times \delta_i(t);$$

$$\min\left(\frac{1}{P_{Tot}(t)} \sum_{i=1}^{N} f_i(P_i(t)) \times P_i(t)\right) = \frac{1}{P_{Tot}(t)} \sum_{i=1}^{N} f_i(P_i^{opt}(t)) \times P_i^{opt}(t).$$

In an embodiment, this determination step includes a sub-step SE1 of determining an activation profile $\delta(t)$ making it possible to respect the relationship $P_{reserve}(t) \leq \sum_{i=1}^{N}(P_{max}^i - P_i(t)) \times \delta_i(t)$ and corresponding to the lowest number of activated electric generators, the determination being carried out while assuming an equitable distribution of the electric power produced $P_i^{eq}(t)$ by each electric generator i. Equitable distribution is taken to mean a distribution such that for any activated generator i, j the relationship $$\frac{P_i(t)}{P_i^{max}} = \frac{P_j(t)}{P_j^{max}}$$

is met while respecting $P_{Tot}(t) = \sum_{i=1}^{N} P_i(t)\delta_i(t)$. Hereafter, $\delta(t)$ will designate the activation profile at an instant t. This activation profile $\delta(t)$ corresponds to a set of configurations, each configuration being associated with an N-uplet $(\delta_1(t) \ldots \delta_i(t) \ldots \delta_N(t))$ of coefficients of activation $\delta_i(t)$ where N is the number of considered electric generators.

This sub-step SE1 of determining the activation profile $\delta(t)$ may be illustrated through an example in which three identical electric generators G1, G2, G3 being able to deliver a maximum electric power of 1 (in other words $P_i^{max} = P^{max} = 1$) are assumed. In this example, it is also assumed that the required power is equal to 1.5 (in other words $P_{tot}(t)=1.5$) and that the reserve power is equal to 0.3 (in other words $P_{reserve}(t)=0.3$). It appears apparent that the activation of a single electric generator is not sufficient since the required power $P_{tot}(t)$ is greater than the maximum power $P_i^{max}$ that each generator i can supply. An activation profile $\delta(t)$ involving two activated generators and corresponding to the triplets $\{(1,1,0), (0,1,1), (1,0,1)\}$ (that is to say with three different configurations) may on the other hand be considered. In order to determine if these three configurations can be retained, an equitable distribution of the electric power produced $P_i^{eq}(t)$ by each electric generator i is assumed. Equitable distribution is taken to mean a distribution such that for any activated generator i,j the relationship $$\frac{P_i(t)}{P_i^{max}} = \frac{P_j(t)}{P_j^{max}}$$

is met while respecting $P_{Tot}(t) = \sum_{i=1}^{N} P_i(t)\delta_i(t)$. In other words, an equitable distribution in the sense of the invention does not signify that each generator G1, G2, G3 supplies the same electric power $P_i(t)$, this situation only corresponding to the particular case in which all the generators G1, G2, G3 have an identical maximum power $P_i^{max}$. It is important to note that the equitable distribution of power is different from the optimal distribution of power. The three electric generators being here equivalent, the computation of the activation profile may be limited to a single one of these configurations. On the other hand, if each generator was different from the others, it would then be necessary to perform the computations that follow for each of the configurations in order to study each of the configurations independently. For two active generators, the equitable power $P_i^{eq}(t)$ is equal to 0.75 i.e. K=0.75. In this configuration, the power still available is given by $\sum_{i=1}^{N}(P_{max}^i - P_i^{eq}(t)) \times \delta_i(t) = (1-0.75) \times 1 + (1-0.75) \times 1 + (1-0.75) \times 0 = 0.5$. Yet $P_{reserve}(t)=0.3 \leq 0.5$: the condition concerning the reserve power $P_{reserve}(t)$ is thus indeed respected. Knowing that the activation profile $\delta(t)$ must be chosen so as to obtain the lowest number of active electric generators and that a number of two active electric generators is necessary and sufficient to meet the criteria of required power $P_{tot}(t)$ and reserve power $P_{reserve}(t)$, the number of active generators to consider N'(t) is equal to 2. At the end of this sub-step SE1, the activation profile is thus determined and equal to $\delta(t)=\{(1,1,0), (0,1,1), (1,0,1)\}$. In other words, there are always two active electric generators and an inactive electric generator. It is now appropriate to determine the optimal power $P_i^{opt}(t)$ associated with each electric generator i.

In an embodiment, if a configuration of the activation profile $\delta(t)$ corresponds to the current activation profile of the generators, the configuration is chosen as being the activation profile. In the above example, the determined activation profile is $\delta(t)=\{(1,1,0), (0,1,1), (1,0,1)\}$. If the generators that are active at the moment of the elaboration of the set point correspond to the activation profile (1,1,0), then the activation profile retained will be (1,1,0), the configurations (0,1,1) and (1,0,1) being eliminated. This makes it possible to avoid needlessly activating a new generator (while needlessly deactivating another).

The determination step next includes a sub-step SE2 of computing, for a plurality of distributions of the power supplied $P_i(t)$ by each electric generator i compatible with the determined activation profile δ(t) and respecting the equality $P_{tot}(t)=\sum_{i=1}^{N}P_i(t)$, the fuel consumption per unit of electrical energy produced $$sfc(t) = \frac{1}{P_{tot}(t)}\left[\sum_{i=1}^{N} f_i(P_i(t)) \times P_i(t)\right].$$

In other words, for each active generator i, the power supplied $P_i(t)$ is made to vary, so as to obtain a plurality of distributions of power supplied $P_i(t)$ between the generators, each distribution being such that $P_{tot}(t)=\sum_{i=1}^{N}P_i(t)$. Then, for each of these distributions, the value of the fuel consumption per unit of electrical energy produced sfc(t) is computed.

For example, in the case of the three identical generators mentioned above and for the configuration (1,1,0) of the activation profile δ(t), the power supplied $P_1(t)$ by the first generator is varied from 0.5 to 1 whereas the power supplied $P_2$ (t) by the second generator is varied from 1 to 0.5 (the limits chosen making it possible to ensure that, for each power triplet, $P_{tot}(t)=1.5$), whereas the power supplied $P_3(t)$ by the third generator is maintained at zero (the latter not being active). Thus, a plurality of triplets $(P_1(t), P_2(t), 0)$ is constituted. It thus possible, from these triplets, to compute, for each triplet, a value of fuel consumption per unit of electrical energy produced given by $$sfc(t) = \frac{1}{P_{tot}(t)}\sum_{i=1}^{N} f_i(P_i(t)) \times P_i(t).$$

In the present case, the generators being identical, it is not necessary to carry out again the computation for the configurations (0,1,1) and (1,0,1) of the activation profile δ(t). Such a computation would on the other hand be necessary in the case of different electric generators. At the end of this sub-step SE2, a plurality of values of the fuel consumption per unit of electrical energy produced sfc(t) is obtained, each of these values being associated with a power distribution that can be formed into a power triplet $(P_1(t), P_2(t), P_3(t))$.

The determination step finally includes a sub-step SE3 of determining the electric power $P_i(t)$ supplied by each generator i, designated optimal power $P_i^{opt}(t)$ such that:

$$\min\left(\frac{1}{P_{Tot}(t)}\sum_{i=1}^{N} f_i(P_i(t)) \times P_i(t)\right) = \frac{1}{P_{Tot}(t)}\sum_{i=1}^{N} f_i(P_i^{opt}(t)) \times P_i^{opt}(t)$$

In other words, the distribution or distributions of powers that make it possible to minimise the fuel consumption per unit of electrical energy produced sfc(t) is sought.

It is possible to illustrate this sub-step SE3 within the context of the example described previously. In this example, at the end of the computation sub-step SE2, a plurality of values of fuel consumption per unit of electrical energy produced sfc(t) is obtained, each of these values being associated with a power distribution that can be formed of a power triplet $(P_1(t), P_2(t), P_3(t))$. It is thus possible to determine the lowest value of the fuel consumption per unit of electrical energy produced among the plurality of values. This value corresponds to min $$\left(\frac{1}{P_{Tot}(t)}\sum_{i=1}^{N} f_i(P_i(t)) \times P_i(t)\right)$$

and may be associated with one or more power distributions (or to one or more power triplets). In other words, the powers forming the power triplet(s) associated with this lowest value correspond to the optimal powers $P_i^{opt}(t)$. In the example chosen and considering the configuration (1,1,0), if it is assumed that the function $f_i(x)$ is a monotonically decreasing function, two triplets $(P_1^{opt}, P_2^{opt}, P_3^{opt})$ minimise the fuel consumption per unit of electrical energy produced: (1,0.5,0) and (0.5,1,0). It will be appreciated that the result may be taken again for the two other configurations ((0,1,1) and (1,0,1)) of the activation profile δ(t). Thus, for the example chosen, the implementation of the method according to a first aspect of the invention has made it possible to determine the optimal power $P_i^{opt}$ of each electric generator i making it possible to respect the required power $P_{tot}(t)$, the reserve power $P_{reserve}(t)$ and to minimise the fuel consumption per unit of electrical energy produced sfc. More specifically, by taking into account all the possible configurations $(\delta_1(t) \ldots \delta_i(t) \ldots \delta_N(t))$ of the activation profile δ(t), the power $(P_1^{opt}, P_2^{opt}, P_3^{opt})$ is equal to (1,0.5, 0), (0.5,1,0), (0,0.5,1), (0,1,0.5), (1,0,1.5) or (0.5,0,1).

In an embodiment, each generator is associated with a minimum power $P_i^{min}$. In other words, the power supplied $P_i(t)$ by each generator is comprised between $P_i^{min}$ and $P_i^{max}$. This embodiment is particularly suited to cases where a minimum level of production is required for example during the use of generator units. In this case, when the power supplied $P_i(t)$ by each active generator is varied so as to obtain a plurality of values, this variation is carried out while respecting the minimum power $P_i^{max}$.

Figure 5:
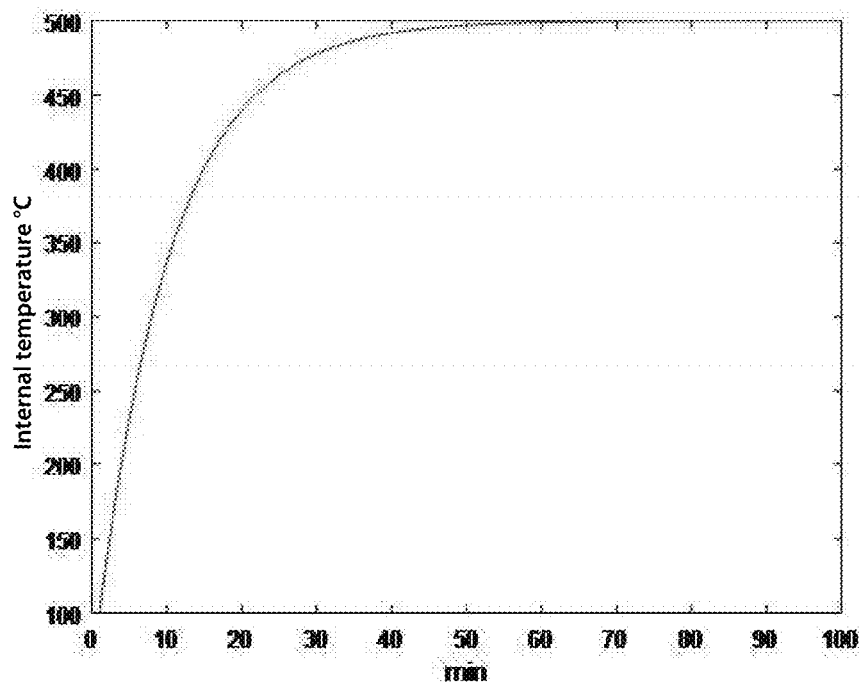
FIG. 5 shows the evolution of the temperature of a generator over time for a given produced power.

In an embodiment, each electric generator i is associated with a temperature $T_i(t)$. In addition, the variation in this temperature at the instant t is given by $$\frac{dT_i(t)}{dt} = g_i(P_i(t), T_i(t))$$

where $g_i(x, y)$ is a function that gives the variation in temperature of the generator i as a function of the power x supplied by the generator i and of the temperature y of the generator. Indeed, the conversion of fuel into electrical energy in general releases heat which leads to heating of the generator itself. It is then important to take account of this heating in the determination of the optimal power so as not to damage the generator in question. An example of plot of temperature as a function of time t for a given power $x_i$ is illustrated in FIG. 5. In an embodiment, each generator i is also associated with a maximum temperature $T_i^{max}$.

In an embodiment, during the sub-step SE3 of determining the distribution of the electric power $P_i(t)$ supplied by each generator, when several optimal distributions are determined, the distribution or the distributions retained are those that attribute to each electric generator i an electric power $P_i(t)$ inversely proportional to the temperature $T_i(t)$ of the electric generator i when such distributions are possible. For example, if two distributions of the electric power $(P_1(t), P_2(t), P_3(t))=(0.8,0.6,0)$ or $(0.6,0.8,0)$ exist, and that the temperature of the first generator is greater than the temperature of the second generator (i.e. $T_1(t)>T_2(t)$), then the second distribution (0.6,0.8,0) will be chosen.

In an embodiment, during the sub-step SE3 of determining the distribution of the electric power $P_i(t)$ supplied by each generator, when several optimal distributions are determined, the distribution or the distributions retained are those that make it possible to minimise the maximum temperature reached by each electric generator i for a given horizon t+H where H is the duration separating the instant t of the considered horizon. In other words, the distribution or distributions retained are those of which the supplied powers $P_i(t)$ attributed to each generator i are compliant with the following relationship $P_i(t) \in P_i^*$: $\text{Min}(\max(T_i(P_i(t+H))))$ where H is the chosen horizon and $P_i^*$ is the optimal power for the generator i.

As has just been detailed, a method 100 according to a first aspect of the invention makes it possible to obtain an optimal power distribution in order to minimise fuel consumption. However, this optimisation has a cost: the adoption of very disparate supplied powers $P_i(t)$ between generators. If such disparities do not present a problem when they occur over short periods they can on the other hand, if they are maintained too long, cause problems of too high required power for certain units G1, G2, G3. A means of overcoming this drawback is to adopt such a distribution only when the latter represents a substantial benefit relative to an equitable power distribution. As a reminder, equitable distribution is taken to mean a distribution of power $P_i(t)$ between activated generators such that for any activated generator i,j the following equality is met $$\frac{P_i(t)}{P_i^{max}} = \frac{P_j(t)}{P_j^{max}}.$$

Figure 6:
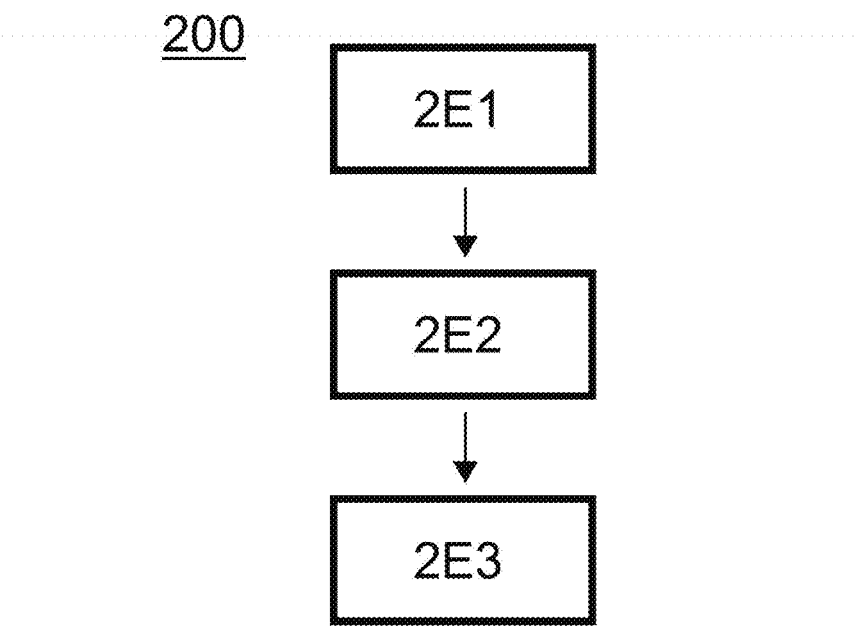
FIG. 6 shows a logic diagram of an embodiment of a method according to a second aspect of the invention.

To do so, a second aspect of the invention illustrated in FIG. 6 relates to a method 200 for determining parameters for controlling N electric generators at an instant t. The method is a function of a required power $P_{tot}(t) = \sum_{i=1}^{N} P_i(t)$ at an instant t with $P_i(t)$ the electric power supplied by the electric generator i at the instant t and a reserve power $P_{reserve}(t) \leq \sum_{i=1}^{N} (P_i^{max} - P_i(t)) \times \delta_i(t)$ an instant t with $P_i^{max}$ the maximum power that the electric generator i can develop and $\delta_i(t)$ the coefficient of activation of the electric generator i which is equal to 1 when the electric generator is on and 0 when the electric generator is off. The diagram of FIG. 1 thus also applies to a method according to a second aspect of the invention.

The method 200 according to a second aspect of the invention includes a step 2E1 of determining the optimal power $P_i^{opt}(t)$ at the instant t associated with each electric generator i so as to minimise the fuel consumption per unit of electrical energy produced $$sfc(t) = \frac{1}{P_{tot}(t)} \sum_{i=1}^{N} f_i(P_i(t)) \times P_i(t)$$

with $f_i(x)$ the function giving the fuel consumption of the electric generator i for the electric power x noted $sfc^{opt}$. As explained previously and detailed in the description of a method according to a first aspect of the invention, the optimisation of the powers generally leads to an inequitable distribution of the powers $P_i(t)$.

Figure 7:
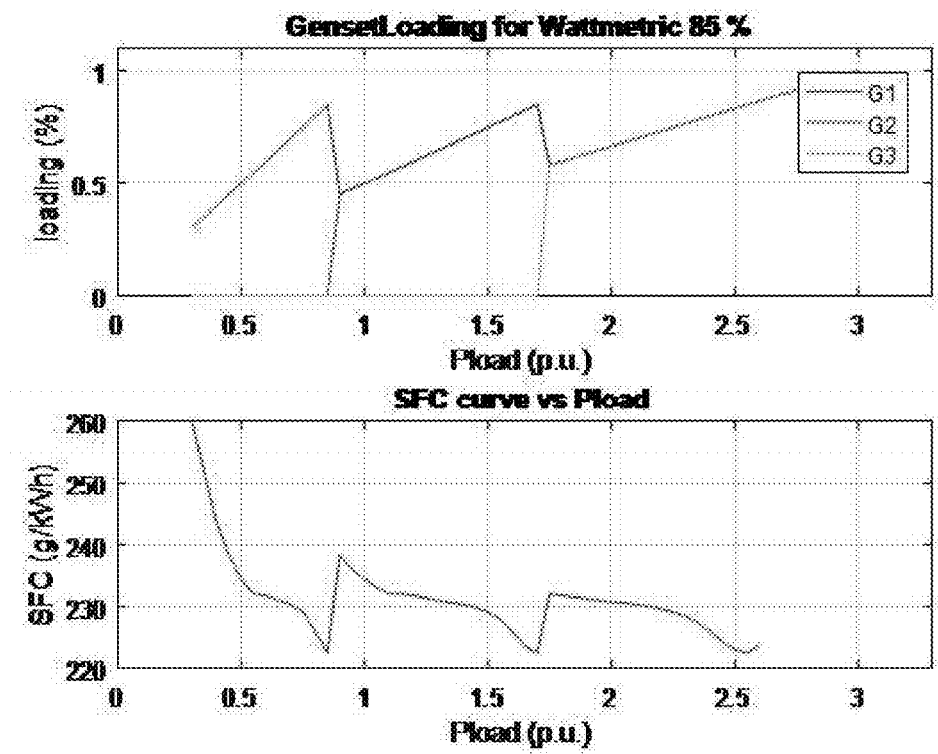
FIG. 7 shows, for the upper part, the power supplied by each electric generator i as a function of the required power and, for the lower part, the value of the fuel consumption per unit of electrical energy produced as a function of the required power.

The method 200 next includes a step 2E2 of determining the fuel consumption per unit of electrical energy produced $$sfc(t) = \frac{1}{P_{tot}(t)} \sum_{i=1}^{N} f_i(P_i(t)) \times P_i(t)$$

associated with an equitable distribution of the electric power supplied by each generator and noted $sfc^{eq}$, the distribution being such that $P_i(t) \leq rP_i^{max}$ with $r \in ]0,1]$. Hereafter, the fraction $r_i$ will be called the fraction of supplied power. The condition $P_i(t) \leq r_i P_i^{max}$ with $r_i \in ]0,1]$ makes it possible to ensure that the power supplied by each generator is only a fraction of the maximum power of the generator, for example 85% i.e. $\forall i$; $r_i = 0.85$. The fraction $r_i$ of supplied power may also be seen as a power threshold above which the activation of a new generator is necessary. It will be appreciated that the equitable distribution (just like the aforementioned optimal distribution) verifies the equalities $P_{tot}(t) = \sum_{i=1}^{N} P_i(t)$ and reserve $P_{reserve}(t) \leq \sum_{i=1}^{N} (P_i^{max} - P_i(t)) \times \delta_i(t)$. At the end of this step, the fuel consumption $sfc^{eq}$ corresponding to an equitable distribution of the power between different generators making it possible to meet the required power is known. FIG. 7 illustrates an equitable distribution between three generators G1, G2, G3 in the case of a fraction of power r=0.85 and of a maximum power $P^{max}$ identical for each generator as a function of the required power (upper curve). It also shows the corresponding fuel consumption per unit of electrical energy produced (lower curve).

Figure 8:
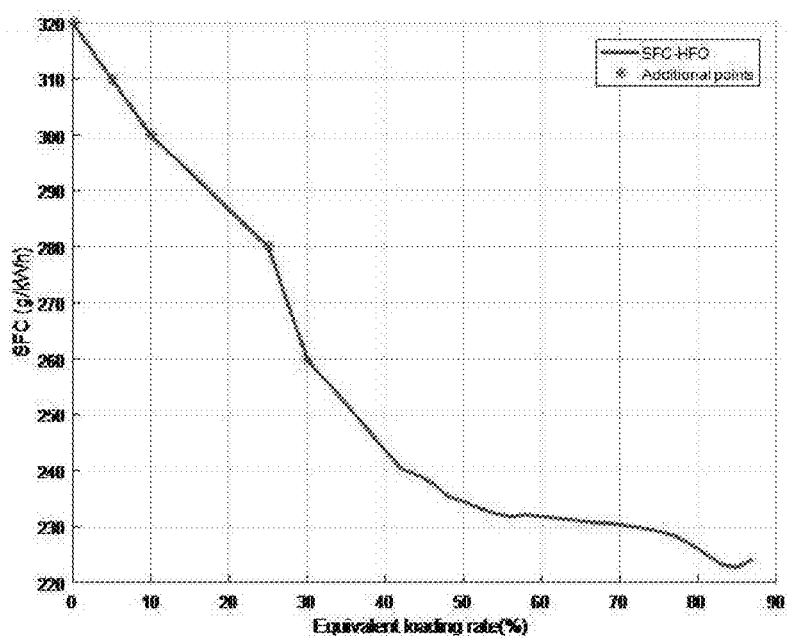
FIG. 8 shows a curve representing the fuel consumption per unit of electrical energy produced by an electric generator as a function of the power supplied by the generator.

In an embodiment, the fraction of maximum power $r_i$ of a generator is chosen such that $\min(f_i) = f_i(r_i P_i^{max})$ where $f_i(x)$ is the function giving the fuel consumption per unit of electrical energy produced by the electric generator i for the electric power x. In other words, the power supplied by a generator when $P_i(t) = r_i P_i^{max}$ minimises the fuel consumption of the generator. In an embodiment, the method includes, for each generator, a step of determining the fuel consumption per unit of electrical energy produced as a function of the power so as to obtain the function $f_i(x)$ for each generator. Alternatively, this fuel consumption may be supplied by the manufacturer or the distributor of the generator. An example of fuel consumption per unit of electrical energy produced as a function of the output power is represented in FIG. 8. In this example, $\min(f_i(x))$ is obtained with r=0.85 and this value of the fraction of maximum power will thus be retained for the implementation of a method 200 according to a second aspect of the invention. It will also be noted that the function $f_i(x)$ can vary as a function of each generator and that thus the latter as well as the value of the fraction $r_i$ of maximum power will have to be determined for each generator.

The method next includes a step 2E3 of determining the power $P_i(t)$ associated with each generator as a function of the value of $sfc^{eq}$ and $sfc^{opt}$. In other words, the distribution of the power $P_i(t)$ among the N generators is going to be made as a function of the fuel consumption associated with an equitable distribution $sfc^{eq}$ and of the fuel consumption associated with an optimal distribution $sfc^{opt}$.

In an embodiment, during the step 2E3 of determining the power $P_i(t)$ associated with each generator includes:
a sub-step 2E31 of determining the ratio $$\frac{sfc^{eq}}{sfc^{opt}};$$

and when the ratio $$\frac{sfc^{eq}}{sfc^{opt}}$$

is greater man a predefined threshold, a sub-step 2E32 of determining the power associated with each generator $P_i(t)$ conforming to the equitable distribution of the supplied power, if not, a sub-step 2E33 of determining the power associated with each generator $P_i(t)$ conforming to the optimal distribution of supplied power.

In other words, optimal distribution will only be chosen if it represents a substantial benefit compared to equitable distribution. In an embodiment, the predefined threshold is equal to 0.99. In other words, when optimal distribution is more efficient by 1% compared to equitable distribution of power, optimal distribution is the retained distribution.

Figure 10:
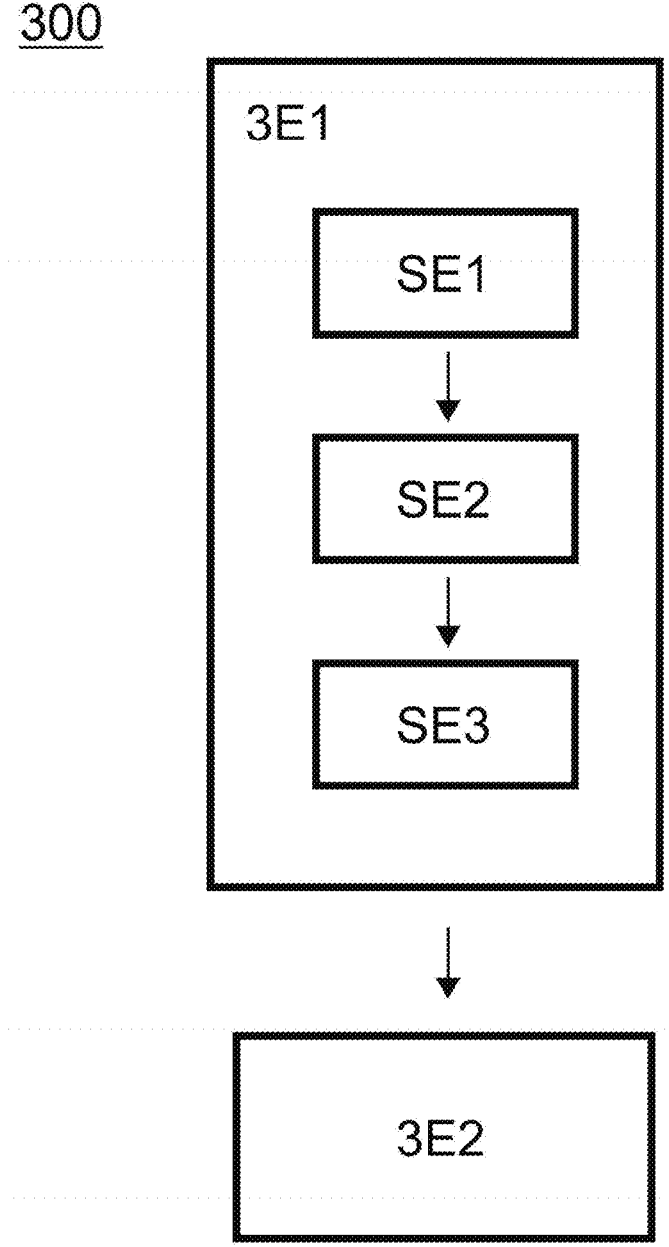
FIG. 10 shows a logic diagram of an embodiment of a method according to a third aspect of the invention.

A third aspect of the invention illustrated in FIG. 10 relates to a method 300 for controlling N electric generators including a first step 3E1 of implementing a method 100, 200 for determining parameters for controlling N electric generators according to a first or a second aspect of the invention and a step 3E2 of sending the parameters thereby determined to the N electric generators.

Figure 11:
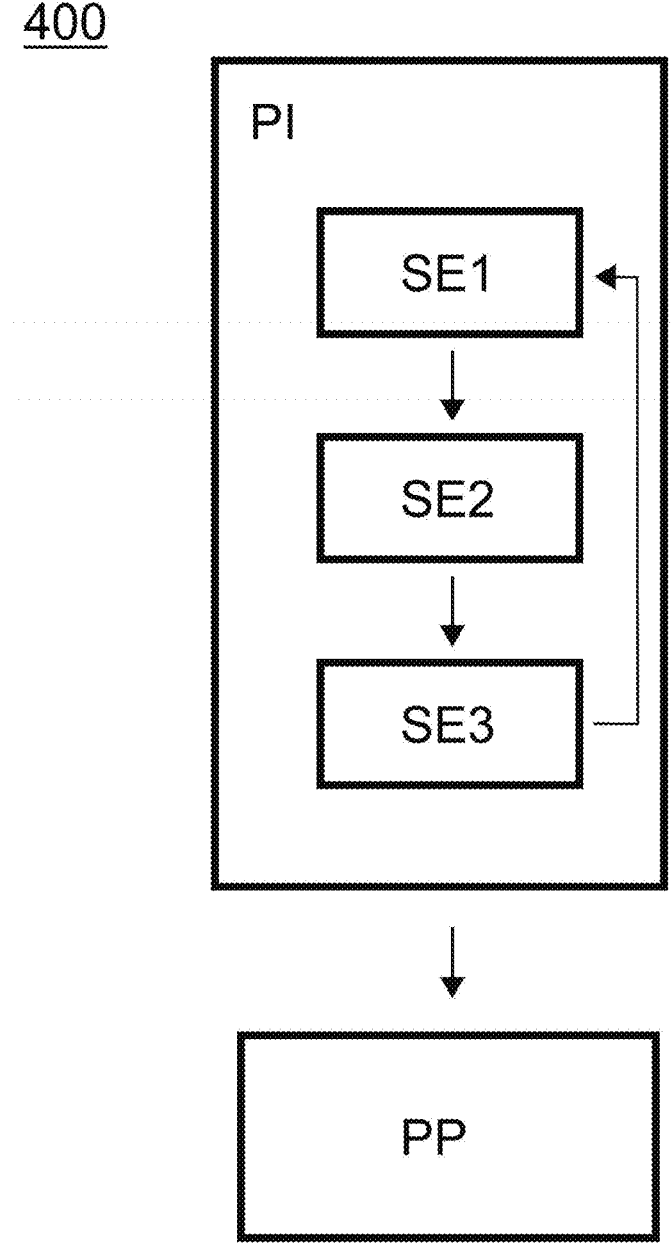
FIG. 11 shows a logic diagram of an embodiment of a method according to a fourth aspect of the invention.

A fourth aspect of the invention illustrated in FIG. 11 relates to a method 400 for controlling N electric generators including a first initialisation phase PI during which the method 100, 200 according to a first aspect of the invention or a second aspect of the invention is implemented a plurality of times, each implementation being carried out with different values of required power $P_{tot}(t)$ and of reserve power $P_{reserve}(t)$ so as to obtain a look up table.

Thus, when the initialisation phase is carried out using a method according to a first aspect of the invention, the look up table makes it possible to supply, for a value of required power $P_{tot}(t)$ and a reserve power $P_{reserve}(t)$, the optimal distribution or distributions of power $(P_1(t) \ldots P_i(t) \ldots P_N(t))$. In an embodiment, when the method 100 according to a first aspect of the invention implemented during the initialisation phase PI takes into account the temperature $T_i(t)$ of each electric generator i, then the method 100 according to a first aspect of the invention is also implemented for different temperatures of the different electric generators. Thus, the look up table makes it possible to supply, for a value of required power $P_{tot}(t)$, a reserve power $P_{reserve}(t)$ and as a function of the temperature $T_i(t)$ of each electric generator i, the optimal power distribution or distributions $(P_1(t) \ldots P_i(t) \ldots P_N(t))$.

Similarly, when the initialisation phase PI is carried out using a method 200 according to a second aspect of the invention, the look up table makes it possible to supply, for a value of required power $P_{tot}(t)$ and a reserve power $P_{reserve}(t)$, the optimal and equitable distribution or distributions of power $(P_1(t) \ldots P_i(t) \ldots P_N(t))$ as well as the associated consumption parameters $sfc^{eq}$ and $sfc^{opt}$. In an embodiment, when the method 200 according to a second aspect of the invention implemented during the initialisation phase PI takes into account the temperature $T_i(t)$ of each electric generator i, then the method 200 according to a second aspect of the invention is also implemented for different temperatures of the different electric generators.

The method next includes a second control phase PP during which control parameters are sent to the N electric generators, the control parameters being determined using the look up table.

Figure 9:
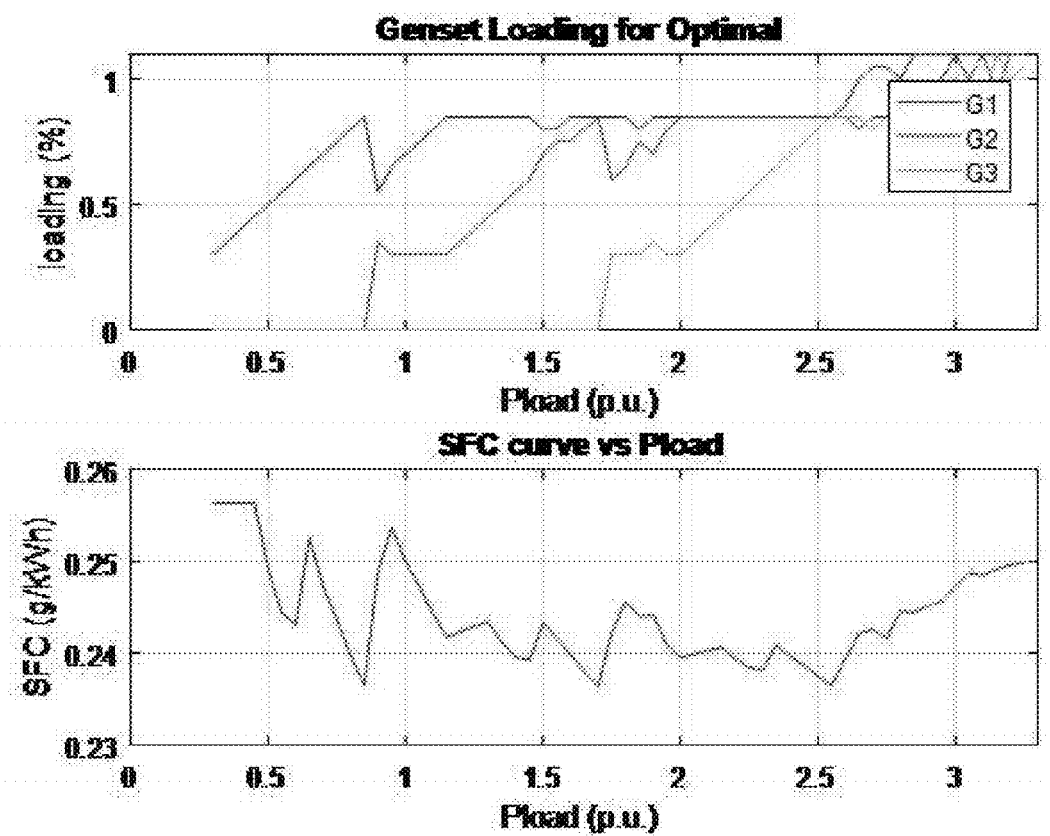
FIG. 9 shows, for the upper part, the power supplied by each electric generator i as a function of the required power and, for the lower part, the value of the fuel consumption per unit of electrical energy produced as a function of the required power.
Figure 12:
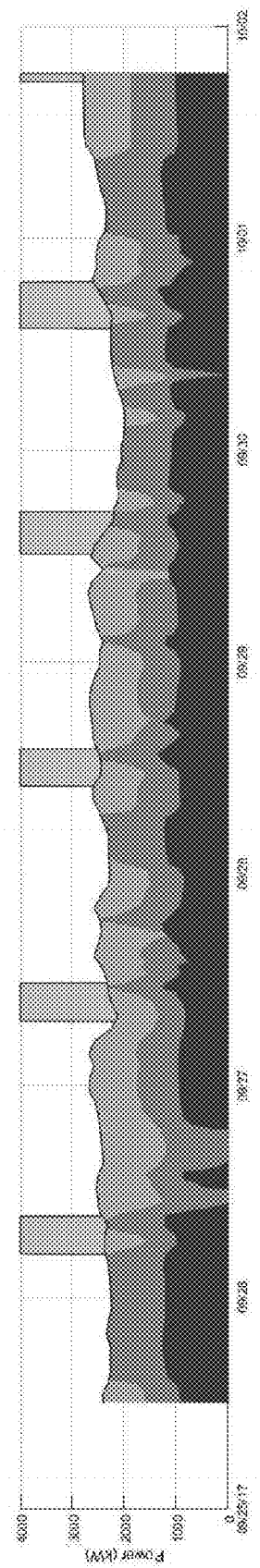
FIG. 12 shows the control set points for three generators obtained with a control method according to the prior art.
Figure 13:
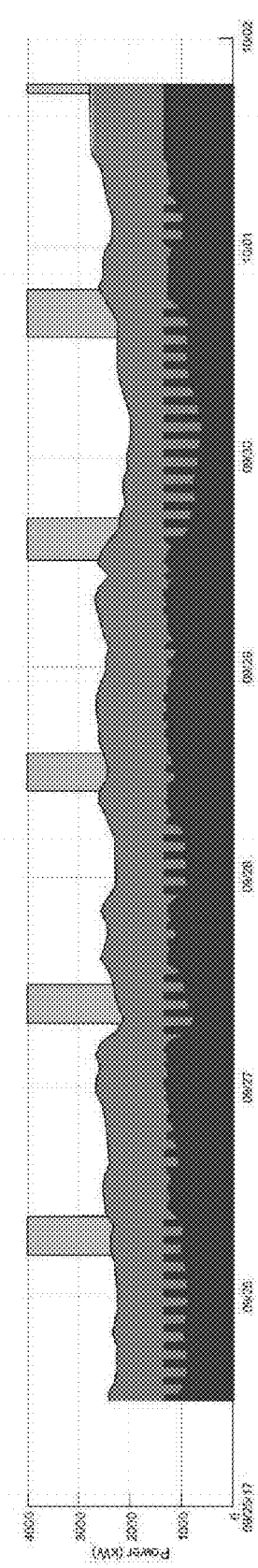
FIG. 13 shows the control set points for three generators obtained with a control method according to an embodiment of the invention.

An exemplary embodiment of the method according to a third or fourth aspect of the invention is illustrated in FIGS. 9, 12 and 13 in the case where the initialisation phase is carried out with a method 100 according to a first aspect of the invention. FIG. 9 illustrates the control of three identical generators G1, G2, G3, each generator having a maximum power $P_i^{max}$ equal to 1600 kW and the reserve power $P_{reserve}$ being chosen equal to 240 kW. More specifically, the upper part of FIG. 6 illustrates the power supplied $P_i(t)$ by each electric generator i (on the y-axis) as a function of the required power $P_{tot}(t)$. The lower part of FIG. 6 illustrates for its part the value of the function sfc as a function of the required power $P_{tot}(t)$.

FIGS. 12 and 13 illustrate, for FIG. 12 the operation of three generators G1, G2, G3 controlled using a method according to the prior art, for FIG. 13 the operation of three generators G1, G2, G3 controlled using a method according to a second 200 or a third 300 aspect of the invention when the initialisation phase is carried out using a method 100 according to a first aspect of the invention. In the case of the method according to the prior art, the three generators G1, G2, G3 are regularly active at the same time in order to meet the demand. In the example given, the fuel consumed was 91.87 m³ and the operating time of the units was 396 h.

In the case of a method according to the invention, only two of the three generators G1, G2, G3 are drawn upon (with the exception of the end of the curve due to heavy required power). Other important element, when a control method according to the invention is implemented, the two generators drawn upon alternate in the supply of the highest power so as to limit the heating of each of them. This alternation is visible in the curves through time slots discernible in the variation in supplied powers. Each front (rising or descending) of a time slot corresponds to a change of attribution of the supplied power, the hottest generator being attributed the lowest power to supply and vice-versa. In the given example, the fuel consumed was 89.82 m³ and the operating time of the units was 310 h. Thus, thanks to the control method according to the invention, it was possible to save 2% of fuel. In addition, it was also possible to reduce the operating time of the generators by 22%, which signifies a consequent decrease in the wear of parts and maintenance. In other words, the implementation of a method according to the invention made it possible to obtain a reduction in fuel consumption and wear (and maintenance) of the electric generators.

Figure 14:
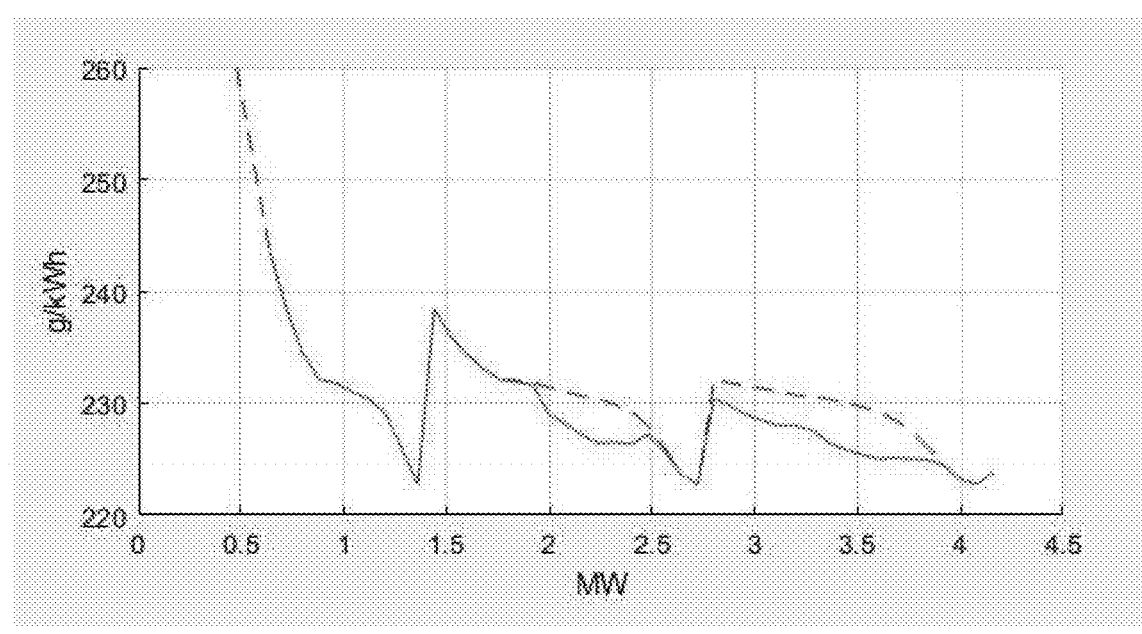
FIG. 14 shows the fuel consumption for an equitable distribution of power (dashed line curve) and for an optimal distribution of power (solid line curve).

A second exemplary embodiment of the method 300, 400 according to a third or fourth aspect of the invention is illustrated in FIG. 14 in the case where the initialisation phase PI is carried out with a method 200 according to a second aspect of the invention. FIG. 14 represents fuel consumption as a function of the total required power. The dashed line curve represents fuel consumption while assuming equitable power distribution and such that $P_i(t) \leq 0.85 P_i^{max}$. The solid line curve represents for its part fuel consumption while assuming optimal power distribution. In this figure, it is possible to differentiate two situations: a first situation in which fuel consumption is substantially the same for optimal distribution and equitable distribution of power (the two curves are superimposed) and a second situation in which fuel consumption for optimal distribution is less than fuel consumption for equitable distribution of power (the solid line curve is below the dashed line curve). In the first situation, the control method is going to adopt equitable distribution of power since the latter makes it possible to obtain substantially the same fuel consumption, while enabling better distribution of the load on all of the activated generators. In the second situation, the control method is going to adopt optimal distribution of power since the latter makes it possible to obtain a fuel saving compared to equitable distribution, at the cost of poor distribution of the load over all of the activated generators. As may be seen in this curve, the control will be done in most cases in a regime of equitable power distribution, and thus better distribution of the load over all of the activated generators. More specifically, the control is going to be carried out according to equitable power distribution for a required power comprised between 0 and 1.2 p.u. then between 1.6 and 1.75 p.u. and finally above 2.45 p.u., optimal distribution being adopted in the other cases.

Sometimes, when the system is in the second situation, it is desirable that the switch over from equitable power distribution to optimal power distribution does not take place automatically but after validation by an operator, for example for safety reasons or for technical reasons. To do so, when the determined control parameters assume a transition from equitable distribution to optimal distribution, the transition is subject to validation by an operator, the parameters corresponding to equitable distribution being used as long as validation by the operator has not been made. In other words, as long as the operator has not validated the transition, the control is carried out while assuming equitable power distribution. Once the transition has been validated by the operator, the control takes place using optimal power distribution (except if, meanwhile, the system is once again in the first situation).

A fifth aspect of the invention relates to a control system including devices (e.g. one or more electronic circuits) for implementing a method according to a second or a third aspect of the invention. The control system includes a computing system, for example a processor, an ASIC or FPGA card, associated with a memory. The memory may contain the instructions and variables necessary for the execution of the method by the computing system. In order to collect input parameters such as the required power $P_{tot}(t)$ and the reserve power $P_{reserve}(t)$, the control system may include an input device (for example a keyboard associated with a screen or instead a touch screen) on which an operator can input the corresponding information. Alternatively or complementarily, these parameters may in determined, in all or in part, automatically. For example, in the case of a ship, the reserve power $P_{reserve}(t)$ is determined as a function of the current situation of the ship: dockside, while manoeuvring, on the open sea, etc. The input device also make it possible for a user to inform the control system of the characteristics of each electric generator i such as the maximum power $P_i^{max}$, minimum power $P_i^{min}$ or the maximum temperature $T_i^{max}$ not to exceed. In addition, when temperature is taken into account for the determination of control set points, the control system may include a communication system in order to obtain the temperature of the sensors placed at the level of each electric generator. Indeed, generally speaking, each electric generator has a temperature sensor in order to ensure good monitoring of its operation. The control system may thus be configured to receive data collected by the sensors. Similarly, the control system may also include a communication system connected to the different electric generators so as to communicate to the latter the set points, that is to say the power $P_i(t)$ that each electric generator i has to supply.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for determining parameters for controlling N electric generators at an instant t, said method comprising, for a required power $P_{tot}(t)=\Sigma_{i=1}^{N} P_i(t)$ at an instant t with $P_i(t)$ the electric power supplied by the electric generator i at the instant t and a reserve power $P_{reserve}(t) \leq \Sigma_{i=1}^{N}(P_i^{max}-P_i(t)) \times \delta_i(t)$ at an instant t with $P_i^{max}$ the maximum power that the electric generator i can develop and $\delta_i(t)$ the coefficient of activation of the electric generator i which is equal to 1 when said electric generator is on and 0 when said electric generator is off, a step of determining the optimal power $P_i^{opt}(t)$ at the instant t associated with each electric generator i so as to minimise the fuel consumption per unit of electrical energy produced $$sfc(t) = \frac{1}{P_{tot}(t)} \sum_{i=1}^{N} f_i(P_i(t)) \times P_i(t)$$

with $f_i(x)$ the function giving the fuel consumption of the electric generator i for the electric power x.

2. The method according to claim 1, wherein the step of determining the optimal power $P_i^{opt}(t)$ at the instant t associated with each electric generator i includes:

a sub-step of determining an activation profile $\delta(t)$ making it possible to respect the relationship $P_{reserve}(t) \leq \Sigma_{i=1}^{N}(P_i^{max}-P_i(t)) \times \delta_i(t)$ and corresponding to the lowest number of activated electric generators, said determination being carried out while assuming an equitable distribution of the electric power produced $P_i^{eq}$ by each electric generator i such that for any activated generator i, j the relationship $$\frac{P_i(t)}{P_i^{max}} = \frac{P_j(t)}{P_j^{max}}$$

is met;

a sub-step of computing, for a plurality of distributions of the power supplied $P_i(t)$ by each electric generator i compatible with the determined activation profile $\delta(t)$ and respecting the equality $P_{tot}(t)=\Sigma_{i=1}^{N} P_i(t)$, the fuel consumption per unit of electrical energy produced $$sfc(t) = \frac{1}{P_{tot}(t)} \sum_{i=1}^{N} f_i(P_i(t)) \times P_i(t);$$

a sub-step of determining the distribution of the electric power $P_i(t)$ supplied by each generator, designated optimal power $P_i^{opt}(t)$ such that $$\min\left(\frac{1}{P_{Tot}(t)} \sum_{i=1}^{N} f_i(P_i(t)) \times P_i(t)\right) = \frac{1}{P_{Tot}(t)} \sum_{i=1}^{N} f_i(P_i^{opt}(t)) \times P_i^{opt}(t)$$

so as to obtain at least one optimal distribution of power.

3. The method according to claim 2, wherein each generator i is associated with a minimum power $P_i^{min}$.

4. The method according to claim 1, wherein each electric generator i is associated with a temperature $T_i(t)$, the variation in the temperature at the instant t being given by $$\frac{dT_i(t)}{dt} = g_i(P_i(t), T_i(t))$$

where $g_i(x,y)$ is a function that gives the variation in temperature of the generator i as a function of the power x supplied by said generator i and of the temperature y of said generator, said temperature being taken into account during the determination of the control parameters.

5. The method according to claim 2, wherein each electric generator i is associated with a temperature $T_i(t)$, the variation in the temperature at the instant t being given by $$\frac{dT_i(t)}{dt} = g_i(P_i(t), T_i(t))$$

where $g_i(x,y)$ is a function that gives the variation in temperature of the generator i as a function of the power x supplied by said generator i and of the temperature y of said generator, said temperature being taken into account during the determination of the control parameters and wherein, during the sub-step of determining the distribution of the electric power $P_i(t)$ supplied by each generator, when several optimal distributions are determined, the distribution or the distributions retained are those that attribute to each electric generator i an electric power $P_i(t)$ inversely proportional to the temperature $T_i(t)$ of said electric generator i.

6. The method according to claim 2, wherein each electric generator i is associated with a temperature $T_i(t)$, the variation in the temperature at the instant t being given by $$\frac{dT_i(t)}{dt} = g_i(P_i(t), T_i(t))$$

where $g_i(x,y)$ is a function that gives the variation in temperature of the generator i as a function of the power x supplied by said generator i and of the temperature y of said generator, said temperature being taken into account during the determination of the control parameters, and wherein, during the sub-step of determining the distribution of the electric power $P_i(t)$ supplied by each generator, when several optimal distributions are determined, the distribution or the distributions retained are those that make it possible to minimise the maximum temperature reached by each electric generator i for a given horizon t+H where H is the duration separating the instant t of the considered horizon.

7. A method for controlling N electric generators comprising a first step of implementing a method for determining parameters for controlling N electric generators according to claim 1 and a second step of sending the parameters thereby determined to said N electric generators.

8. A method for controlling N electric generators comprising a first initialisation phase during which the method according to claim 1 is implemented a plurality of times, each implementation being carried out with different values of required power $P_{tot}(t)$ and of reserve power $P_{reserve}(t)$ so as to obtain said look up table and a second control phase during which control parameters are sent to said N electric generators, said control parameters being determined using the look up table.

9. A control system including one or more electronic circuits for implementing the steps of the method according to claim 1.

10. A non-transitory computer readable medium comprising machine readable instructions which, when the instructions are executed by a computer, cause the computer to implement the steps of the method according to claim 1.

* * * * *